United States Patent [19]

Marin, Jr. et al.

[11] Patent Number: 5,405,108
[45] Date of Patent: Apr. 11, 1995

[54] SPACE DEBRIS CLEARING DEVICE

[75] Inventors: Laddie Marin, Jr.; William K. DeVault, both of Albuquerque, N. Mex.; Joseph J. Secary, Golden, Colo.

[73] Assignee: The United States of America as represented by the Secretary of the Air Force, Washington, D.C.

[21] Appl. No.: 940,147

[22] Filed: Sep. 3, 1992

[51] Int. Cl.⁶ .................... F42B 1/00; B64G 1/48; B64G 1/46
[52] U.S. Cl. ................... 244/158 R; 244/163; 102/293
[58] Field of Search ............. 244/158 R, 163; 102/293

[56] References Cited

U.S. PATENT DOCUMENTS

| | | | |
|---|---|---|---|
| 4,408,563 | 10/1983 | Heimbach et al. | 118/692 |
| 4,707,979 | 11/1987 | Gutsche | 60/203.1 |
| 4,750,692 | 6/1988 | Howard | 244/158 R |
| 4,775,120 | 10/1988 | Marwick | 244/158 R |
| 5,082,211 | 1/1992 | Werka | 244/158 R |
| 5,153,407 | 10/1992 | Schall | 219/12.6 |
| 5,199,671 | 4/1993 | Marwick | 244/158 R |

OTHER PUBLICATIONS

Lovece, "The Impeding Crisis of Space Debris" Astronomy (Aug. 1987) vol. 15, No. 8 pp. 6-13.

Primary Examiner—Andres Kashnikow
Assistant Examiner—Virna Lissi Mojica
Attorney, Agent, or Firm—Donald J. Singer; Samuel B. Smith; Thomas C. Stover

[57] ABSTRACT

The space debris clearing device of the invention, following launch and placement in or near an orbit considered to be highly populated with debris, is intended to clear the debris allowing safe paths and orbits for space assets. The device is made of a castable, energetic material, and shaped to meet specific clearing requirements. Once in position the device is remotely detonated, and an impulse, caused by the expanding detonation products, is imparted to the debris, pushing the debris into a reentry or earth escape trajectory.

11 Claims, 2 Drawing Sheets

SPACE DEBRIS CLEARING DEVICE

BACKGROUND OF THE INVENTION

Space debris is growing at a rapid rate and poses a hazard to future space vehicles. Although the probability of collision is low, collision speeds could be hypervelocity with the possibility of destruction of space structure.

Space debris can be conveniently grouped into three categories. The first is mission related debris. Inactive payloads, expended satellites, shrouds, clamps, and separation components are examples of debris within this category. A second category is launch related debris resulting from spent rocket stages, combustion products of the rocket stages (primarily aluminum oxide from solid propellants), and paint flakes. Unlike the first category, most of the debris within the second category is small and has less momentum than debris with greater mass. Nevertheless, the large oxide particles, at velocities of several kilometers per second, have the impact effect of a bullet, and enough force to destroy unprotected payloads. The third category of debris results from fragmentation. Collisions, explosion, breakups, and antisatellite (ASAT) testing contribute to this group. Sizes of debris in this group range from the very small untrackable objects to large, locatable objects.

Debris build-up patterns follow exploration of space and debris belts are forming along space trails. As documented in the literature, there is more debris in low earth orbit (LEO) as this was the first region explored and later used operationally. Additionally, all subsequent exploratory and operational missions go through this region, regardless of their final destination, leaving additional debris deposits. This, combined with the natural slow gravitational decay process which brings all the near-earth debris "home," makes the LEO the most debris littered region.

A second region of high interest is at geosynchronous altitude. A strategically placed payload at this altitude remains relatively fixed over a given position on earth. With minimal station keeping efforts and the need for only a single ground control station, a single satellite can provide constant coverage for almost half of the globe. This makes the geosynchronous altitude a prime parking site for communication and surveillance systems.

Many solutions for the elimination and/or control of space debris within the critical regions discussed are being proposed and have been developed. These solutions relate generally to structural hardening, avoidance, debris retrieval, earth reentry, transfer to dump regions, treaty/agreement, and collectors. Structural hardening has been a traditional solution to prevent penetration damage. This solution, however, has two shortcomings. First, space debris travels at hypervelocities (as high as 15 km/sec), well outside traditional hardening regimes. Technology for developing hardened structure does not exist at these velocities. Secondly, any hardening approach will most likely increase the system's total weight thereby increasingly launch cost and straining the capacity of current launch systems.

Avoidance schemes are being proposed in which orbital payloads would use thrusters to dodge debris on impact trajectories. These schemes, however, project tremendous fuel consumption, which for current satellites in unacceptable. Dodging debris would also require the development of sensor systems to detect and trace debris.

The debris retrieval concept has already been shown to be successful, at least in limited applications. U.S. Pat. No. 4,775,120 to Marwick describes an extraterrestrial transportation apparatus and method in which items could be crash transported to a low earth orbit crash-load capturing satellite for subsequent relocation. U.S. Pat. No. 4,750,692 to Howard relates to a satellite retrieval apparatus comprising a tethered grappling unit having deployable arms with catching ropes and Velcro hook strips on the ends thereof. On impacting the target, the catching ropes envelop the target and each other. The grappling unit is then retrieved along with the target satellite. In addition, a recent Shuttle mission retrieved an inactive satellite which was then repaired and returned to service. The drawback with this concept is the expense of retrieval and difficulty of the operation. Only high valued space debris would qualify for such a debris clearing solution.

Earth reentry involves using the last remaining onboard fuel to project the satellite into a decay orbit. One drawback with this concept is that energy needed to put a satellite into a decay orbit is significant, in many cases more than current satellites have onboard. The prior art provides several alternatives to the use of on-board fuel to project a satellite into a decay orbit. For example, U.S. Pat. No. 4,707,979 to Gutsche describes a method to produce and utilize propulsion forces on objects or devices by the controlled release of energy derived from absorbed radiation. U.S. Pat. No. 4,408,563 to Swales et al relates to a method of separating and ejecting a reentry body from a booster rocket. A pair of diametrically opposed rockets attached to the base of the re-entry body are ignited and provide thrust at an angle resulting in separation velocity and spin to the re-entry body. And, U.S. Pat. No. 3,427,808 to Butcher describes a method and apparatus to generate pressurized gas for satellite propulsion. A quantity of solid or liquid material which is decomposible into the gas state is provided, and either thermal decomposition, photolysis, or radiolysis are employed for the decomposition process. Even if future satellites were somehow required to carry a decay orbit propulsion reserve, this solution again is limited only to the payload category of debris and does little to mitigate the other two categories. Another drawback to this concept is the reentering payload impact location, which can have undesired political and safety implications.

Akin to the reentry concept is the concept of transfer of space debris to a dump orbit or region. Recognizing the burden placed on the propulsion system to cause reentry, especially for satellites in orbits other than the LEO, the concept is to move geosynchronous satellites from their strategic position when they become of little use. This concept also solves the impacting debris problem of the reentry solution, yet does little for the other categories of debris and raises the question of determining suitable junkyard regions.

Efforts to legislate away the space debris problem have had little success. Currently, some LEO regions have been set aside for space developing nations to use. Requirements of restricting solid rocket propulsion systems, eliminating blow away clamps, and similar requirements are being considered.

Overall, the existing and proposed solutions to eliminate or control space debris appear inadequate. None appear able to ensure safe, debris-free missions.

It is therefore the object of the present invention to provide a method to clear space debris to allow for safe orbits for spacecraft flight.

It is another object of the present invention to clear the space debris without resorting to expensive spacecraft to track, collect, and transport the debris.

It is another object of the present invention to clear space debris without creating additional debris in the form of solid by-products of detonation.

SUMMARY OF THE INVENTION

The object of the present invention are accomplished by the following methods, steps, and embodiments. A space debris clearing device would be launched aboard the Shuttle or an expendable launch vehicle. It would be placed in or near an orbit which is considered to be highly populated with debris. The device would be made of a castable energetic material this not requiring a casing which would create more debris. The shape of the device would meet specific clearing requirements. The device would be remotely detonated using a laser or other means. Upon detonation, an impulse, cased by the expanding detonation products, would be imparted to the debris, thereby, pushing the debris into a reentry or an earth escape trajectory. The device is not intended to blow up debris, (which would cause more debris), or to collect any debris.

DESCRIPTION OF PREFERRED EMBODIMENTS

Figure 1:
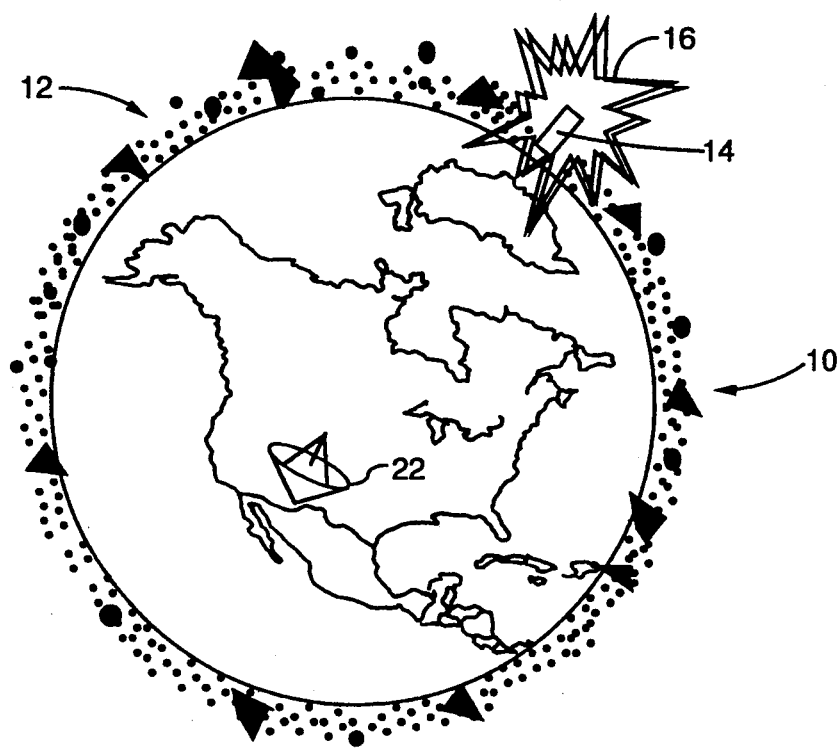
FIGS. 1 and 2 are a conceptual view of the present invention showing detonation and clearance of space debris.

Referring in more detail to the drawings, as shown in FIG. 1, space vehicle 14 is launched from the Earth 10 toward the orbiting ring of space debris 12 and detonates a blast 16 therethrough as shown in FIG. 1.

Figure 2:
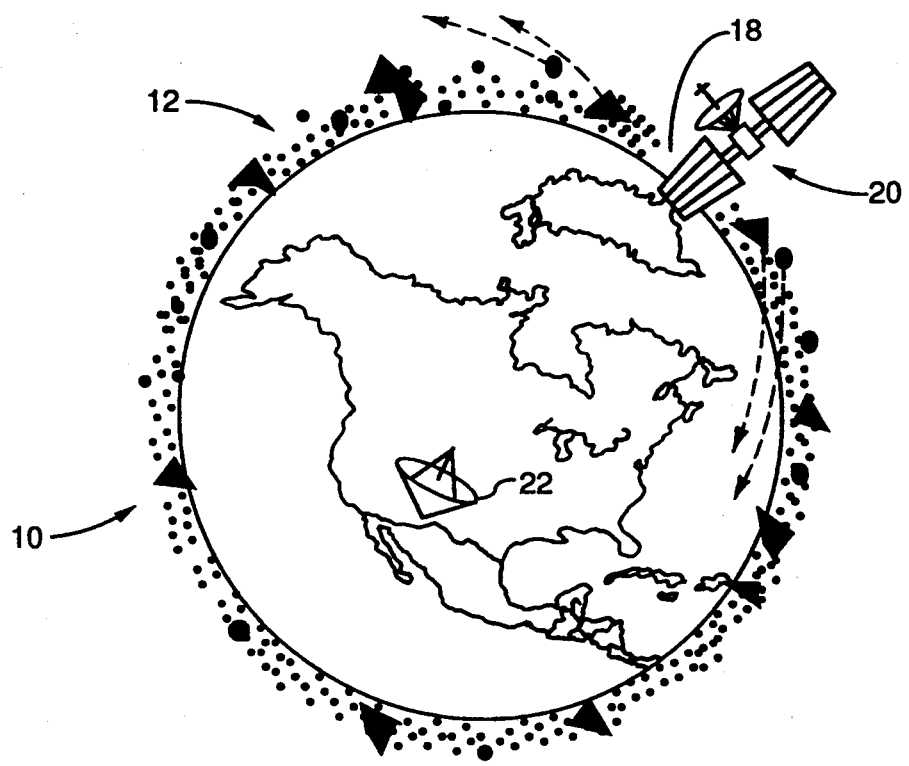

Such blast 16 creates an opening 18 in the orbiting ring of space debris 12 for the payload of space vehicle 14 (FIG. 1) i.e., satellite 20 as shown in FIG. 2.

This satellite 20 as well as the larger orbiting space debris objects are tracked by tracking station 22, as shown in FIG. 2.

The invention relates to the placement, deployment, and detonation of energetic materials in space to provide clear paths through a region for spacecraft travel, or to clear operating regions within a given orbit. The invention accomplishes these goals without an increase in space debris associated with an explosive destruction of the debris.

The energetic materials comprised of oxygen balanced, non-metallic, crystalline high explosives and polymer binders may take two preferred forms. First, the energetic materials may be in the form of specifically tailored charges of material. Second, the energetic materials may be dispersed in a cloud to increase the area affected, as the specific application may direct. Because the charges are either castable (requiring no container) or dispersed, and tailored to achieve complete combustion to gaseous products, no debris creating solid by-products of detonation would occur. Reference to "castable" means the charges could be specifically shaped and initiated to produce a directed impulse to improve effectiveness. Specific application is a criterion to determine shape.

The clearing of space debris could be accomplished prior to launch of a new satellite, or as the debris problems become more pronounced. It is envisioned that future satellites could have a charge on-board so that as the satellite approaches a region of high debris concentration, a charge could be launched to clear a path for the satellite through the debris. FIGS. 1 and 2 illustrate the concept.

Neglecting atmospheric effects, the impulse needed to cause a 1 gram debris particle in a circular orbit to hit the ground is 0.1094 N-sec from 370 km altitude and 0.2357 N-sec from 850 km. From geosynchronous altitude, about 35,863 km, the impulse needed to cause a 1 gram object to reach escape velocity is 1.2771 N-sec.

The equation defining impulse derivable from energetic material in space is:

$$I = \frac{W(2Q_0)^{\frac{1}{2}}}{4R^2}$$

Where:
I = impulse per square meter of target projected area
w = charge mass
$Q_0$ = charge energy (assumed to be 4000 KJ/kg)
R = range between charge and debris particle This equation shows that the impulse is inversely proportional to the square of the range. The term "I" in the equation is in impulse per unit projected area of debris. At a given range, the change in velocity imparted to a debris particle is inversely proportional to the radius of the particle, assuming spherical particles of identical density but different sizes. The reason for this is that larger particles have a greater mass to projected area ratio than smaller particles. These factors greatly limit the practical range over which energetic materials can be used to clear debris from orbit, since both range and particle size affect the change in velocity of a given debris particle. Different changes in velocity result in different orbit changes. Therefore, a single charge of energetic material might cause some debris particles to reenter, others to achieve escape velocity, and still others to have their orbits changed without either escape or reentry. The problem is further complicated by non-circular initial debris particle orbits and the fact that debris particles might be located in all directions around a single energetic material charge.

Figure 3:
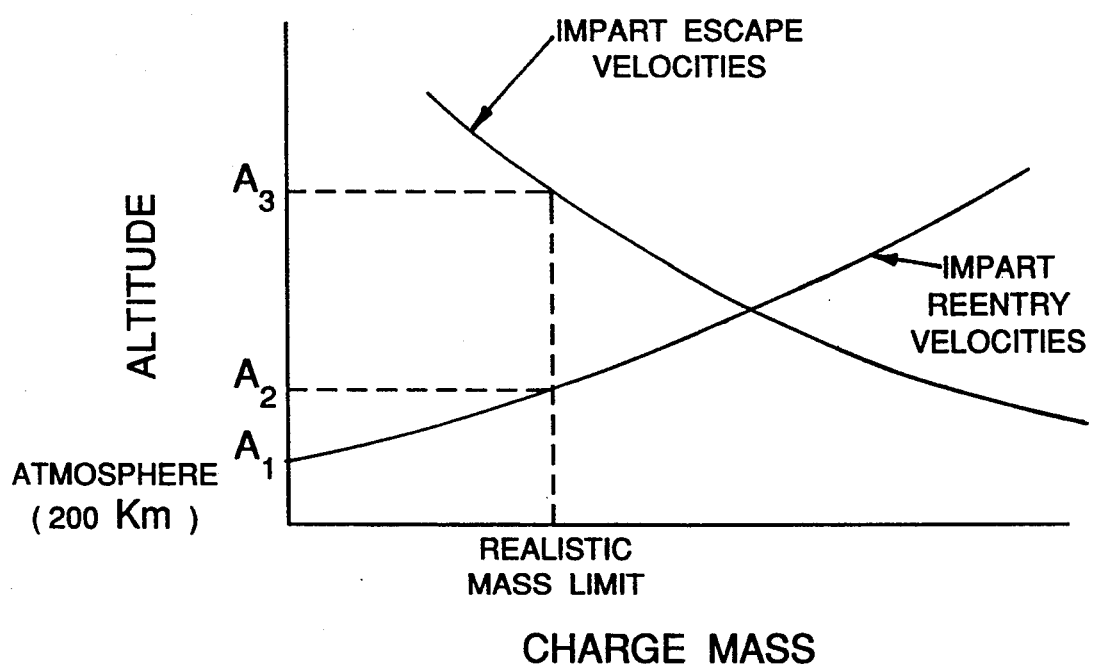
FIG. 3 is a graph showing realistic altitudes for debris clearing devices to impart escape or reentry velocities.

FIG. 3 presents a qualitative picture of the possible effective limits of the energetic material debris clearing concept. Debris at LEOs would require small velocity changes and therefore a small charge mass to cause reentry. As the altitude increases, the charge mass needed to force a given debris particle to reenter would increase. On the other hand, debris at very high altitudes would only require small velocity increases to achieve escape velocities. At lower debris particle altitudes more energy would be needed to escape earth's gravity, requiring increased charge mass. The two curves in FIG. 2 provide a breakeven intersection. Selection of reentry or escape options is based on payload limitations of the launch vehicle delivering the energetic material.

There are two basic classes of targets. The first is a specific region of space with unknown debris particles. In this application, a given region of space would require clearing to allow either a clear path or a safe operating region. This region is to be cleared regardless of debris. The second class of target is a specific debris object. This target would be trackable and could be targeted by a specifically designed device to provide sufficient impulse to move the object from its current orbit.

Based on the target type, its location, and device limitations, one of three basic debris delta velocity strategies would be attempted. The first strategy is to slow the debris and cause it to reenter the earth's atmosphere. The second strategy is to increase velocity to escape velocity causing the debris to escape earth's orbit, and the third is to simply change its velocity and cause the debris to enter a new orbit.

As mentioned above, the energetic materials would be specifically tailored charges. Table 1 provides representative ingredients. Table 2 provides a representative formulation.

TABLE 1

| Oxidizers |
| --- |
| Ammonium perchlorate (AP) |
| Cyclotetramethylene tetranitramine (HMX) |
| Cyclotrimethylene trinitramine (RDX) |
| Ammonium nitrate (AN) |
| Binders |
| Nitrocellulose (PNC) |
| Polypropylene glycol(PPG) |
| Hydroxy-terminated polybutadiene (HTBP) |
| Plasticizers |
| Nitroglycerin (NG) |
| Trimethylolethane trinitrate (TMETN) |
| Curing Agents |

TABLE 2

| INGREDIENT | WT % |
| --- | --- |
| Nitrocellulose | 51 |
| Nitroglycerin | 43 |
| Curing Agents | 6 |

Deployment options include any current or future lift systems (shuttle, expendable launch systems), as well as potentially specifically designed spacecraft which would incorporate such a device.

Various initiation options are available. Initiation options, however, would be required to uniformly initiate the device without increasing debris. Because the device is composed of material which will combust with the application of a threshold energy, a gallium arsenide laser could provide such an initiation energy source.

For regional cleaning, a spherical charge would be deployed to clear a specific region. The charge mass required would be dependent on the volume of the region and the mass and amount of debris. For example, to clear a 1000 cubic meter region containing 500 objects with an average debris particle mass of 0.001 kg at a circular orbital altitude of 2100 kilometers, a charge mass of 377 kilograms would be required if the charge energy was 4000 kilojoules per kilogram.

For specific debris object removal, Table 3 relates to orbital altitudes and approximate charge masses required to cause a 20 kilogram, 0.5 meter square aluminum plate, (0.025 meters thick), debris object to either reenter or escape earth's orbit given that the device is within 2 meters at detonation.

TABLE 3

| Orbital Altitude (km) vs. Charge Mass (kg) | | |
| --- | --- | --- |
|  | Reentry | Escape |
| 500 | 130 | 3890 |
| 1500 (LEO) | 460 | 3640 |
| 2100 | 600 | 3540 |
| 6500 | 1240 | 2840 |
| 21000 | 1770 | 1950 |
| 29000 | 1780 | 1710 |
| 35740 (GEO) | 1800 | 1570 |

Table 3 also provides specific applications of the space debris clearing device. For example, to cause the 20 kilogram debris object at a low earth orbit (LEO) of 1500 kilometers to escape would require a charge mass of 3640 kilograms, but only 460 kilograms to reenter. The same debris object orbiting at a geosynchronous orbit (GEO) of 35740 kilometers would require 1570 kilograms of charge of cause escape, but 1800 kilograms to force reentry. These cases assume a circular orbit. Elliptical orbits where the orbiting body's velocity is continuously changing would vary the above. Therefore, debris orbital characteristics are an important parameter in selecting the most advantageous (based on charge mass) delta velocity strategy.

A shaped charge of energetic material could be used against specific debris objects, increasing the effectiveness. It would allow directed detonation products and thereby reduce the overall charge mass needed to achieve a specific objective. For example, using a semispherical shape charge located 2 meters from a 20 kilogram aluminum debris object orbiting at 1500 kilometers would require only 230 kilograms of energetic material to force reentry. The same object orbiting at 3570 kilometers would require a mass of 785 kilograms to force escape from orbit. This halves the charge mass required.

Another alternative is to disperse the energetic material prior to detonation. This would provide an increased volume detonation source and reduce the distance from detonation to debris object, thereby increasing the velocity change to a given debris particle.

I claim:

1. A method for clearing debris found in earth orbit, which comprises the steps of:
   (a) transporting energetic material proximate orbiting debris, said energetic material being a charge of oxygen balanced, non-metallic crystalline, high explosive and polymer binders;
   (b) launching said energetic material closer to said debris and
   (c) detonating said energetic material through the use of an initiation source, to impart an impulse to said debris to clear same from orbit.

2. The method of claim 1 wherein said impulse is imparted to the said debris so as to decrease the velocity of said debris and cause said debris to reenter the earth's atmosphere.

3. The method of claim 1 wherein said impulse is imparted to the said debris so as to increase the velocity of said debris causing said debris to escape earth orbit.

4. The method of claim 1 wherein the said impulse is imparted to the said debris so as to change the velocity of said debris causing said debris to enter a new orbit.

5. The method of claim 1 wherein the energetic material is castable or dispersed, and tailored to achieve complete combustion.

6. The method of claim 1 wherein the energetic material is specifically shaped and initiated to produce a directed impulse.

7. The method of claim 1 wherein the initiation source is a laser source.

8. The method of claim 1 wherein said impulse that is imparted to said debris to clear same from said orbit, does so without substantially fragmenting said debris beyond said debris existing condition.

9. The method of claim 8 wherein said impulse is imparted to said debris so as to change the velocity thereof causing it to enter a new orbit.

10. The method of claim 8 wherein said impulses is imparted to said debris so as to decrease the velocity thereof, and cause it to re-enter the earth's atmosphere.

11. The method of claim 8 wherein said impulse imparted to said debris increases the velocity thereof causing it to escape earth orbit.

* * * * *